United States Patent
Whitfield, Jr.

(10) Patent No.: US 11,230,273 B2
(45) Date of Patent: Jan. 25, 2022

(54) METHOD FOR AUTONOMOUSLY CONTROLLING A VEHICLE

(71) Applicant: LIEBHERR MINING EQUIPMENT NEWPORT NEWS CO., Newport News, VA (US)

(72) Inventor: James Whitfield, Jr., Newport News, VA (US)

(73) Assignee: LIEBHERR MINING EQUIPMENT NEWPORT NEWS CO., Newport News, VA (US)

( * ) Notice: Subject to any disclaimer, the term of this patent is extended or adjusted under 35 U.S.C. 154(b) by 174 days.

(21) Appl. No.: 16/401,951

(22) Filed: May 2, 2019

(65) Prior Publication Data

US 2020/0346628 A1 Nov. 5, 2020

(51) Int. Cl.
| | |
|---|---|
| *G01C 22/00* | (2006.01) |
| *G05D 1/00* | (2006.01) |
| *B60T 8/174* | (2006.01) |
| *B60T 7/22* | (2006.01) |
| *B60T 8/17* | (2006.01) |
| *B60T 8/171* | (2006.01) |

(52) U.S. Cl.
CPC ........... *B60T 8/174* (2013.01); *B60T 7/22* (2013.01); *B60T 8/17* (2013.01); *B60T 8/171* (2013.01); *G05D 1/0055* (2013.01); *G05D 1/0088* (2013.01); *B60T 2210/12* (2013.01); *B60T 2210/20* (2013.01); *B60T 2230/00* (2013.01); *B60T 2250/02* (2013.01); *B60T 2250/04* (2013.01)

(58) Field of Classification Search
CPC ... B60T 8/174; B60T 7/22; B60T 8/17; B60T 8/171; G05D 1/055; G05D 1/0088; G01S 13/04

USPC ............................................. 701/23
See application file for complete search history.

(56) References Cited

U.S. PATENT DOCUMENTS

| | | | |
|---|---|---|---|
| 6,134,502 | A | 10/2000 | Sarangapani |
| 6,393,362 | B1 | 5/2002 | Burns |
| 6,539,294 | B1 | 3/2003 | Kageyama |
| 6,643,576 | B1 | 11/2003 | O Connor et al. |
| 7,603,235 | B2 | 10/2009 | Mäkelä et al. |
| 9,290,180 | B2 | 3/2016 | Ichinose et al. |
| 9,483,056 | B2 | 11/2016 | Kanai et al. |
| 9,598,823 | B2 | 3/2017 | Tanaka et al. |
| 2009/0088979 | A1 | 4/2009 | Koch |

(Continued)

FOREIGN PATENT DOCUMENTS

EP 3496067 A1 6/2019

*Primary Examiner* — Mahmoud S Ismail
(74) *Attorney, Agent, or Firm* — McCoy Russell LLP

(57) ABSTRACT

The present disclosure relates to a method for autonomously controlling a vehicle performed by a vehicle control system, the vehicle control system comprising a zone control system, a collision prediction system and a braking control system, the method comprising the steps of:
defining in the zone control system at least a first zone and a second zone relative to a vehicle position,
predicting a collision with an obstacle with the prediction system,
autonomously braking the vehicle with the braking control system in a first braking mode if the collision is predicted to occur in the first zone and braking the vehicle with the braking control system in a second braking mode if the collision is predicted to occur in the second zone.

22 Claims, 10 Drawing Sheets

(56) References Cited

U.S. PATENT DOCUMENTS

| | | | |
|---|---|---|---|
| 2015/0151725 A1* | 6/2015 | Clarke | G01C 21/30 |
| | | | 701/28 |
| 2016/0185346 A1 | 6/2016 | Awamori et al. | |
| 2017/0197616 A1* | 7/2017 | Ichikawa | B60T 7/22 |
| 2017/0220042 A1 | 8/2017 | Sakai et al. | |
| 2017/0236422 A1 | 8/2017 | Naka et al. | |
| 2019/0219681 A1* | 7/2019 | Atsushi | G01S 13/931 |
| 2019/0263393 A1* | 8/2019 | Han | B60W 10/20 |
| 2020/0346637 A1* | 11/2020 | Zhou | G06K 9/00812 |

\* cited by examiner

Fig. 4

| S1: | real time calculation of at least one braking distance based on at least one parameter out of speed, grade, adhesion and vehicle weight |

| S2: | defining in the zone control system zone at least a first and a second zone relative to a vehicle position |

| S3: | predicting a collision with an obstacle with the prediction system | if the collision is predicted to occur in the first zone

| S4 | autonomously braking the vehicle with the braking control system in a first braking mode | if the collision is predicted to occur in the second zone

| S5: | autonomously braking the vehicle with the braking control system in a second braking mode |

Fig. 5

- S1: real time calculation of at least one braking distance based on at least one parameter out of speed, grade, adhesion and vehicle weight
- S2: defining in the zone control system zone at least a first, a second and a third zone relative to a vehicle position
- S3: predicting a collision with an obstacle with the prediction system
- S4: determining whether the vehicle is in a dynamic or a static state,
  - if the vehicle is in the dynamic state
    - if the collision is predicted to occur in the first zone
      - S5.1: autonomously operating the vehicle with the collision avoidance system in a first collision avoidance mode
    - if the collision is predicted to occur in the second zone
      - S5.2: autonomously operating the vehicle with the collision avoidance system in a second collision avoidance mode
    - if the collision is predicted to occur in the third zone
      - S5.3: autonomously operating the vehicle with the collision avoidance system in a third collision avoidance mode
  - if the vehicle is in the static state
    - if the collision is predicted to occur in the second zone
      - S6.1: inhibiting motion of the vehicle
    - if the collision is predicted to occur in the first or third zone
      - S6.2: re-planning a trajectory of the vehicle independently from the centralized platform

Fig. 6

S5.1: autonomously operating the vehicle with the collision avoidance system in a first collision avoidance mode S5.1.1: following a pre-planned trajectory received from a centralized platform S5.1.2: autonomously braking the vehicle in a first braking mode with a braking control system of the vehicle S5.1.3: switching from the first collision avoidance mode to the third collision avoidance mode when the step of braking of the vehicle in the first collision avoidance mode results in that the collision is predicted to occur in the third zone.

Fig. 7

- S5.2: autonomously operating the vehicle with the collision avoidance system in a second collision avoidance mode
  - S5.2.1: defining a first sub-zone and a second sub-zone of the second zone
    - if the if the collision is predicted to occur in the first sub-zone of the second zone
      - S5.2.2: autonomously operating the vehicle with the collision avoidance system in a first sub-mode of the second collision avoidance mode,
        - S5.2.2.1: using the first and the second braking system at maximum braking capacity
        - S5.2.2.2: emergency re-planning in a vehicle trajectory control system a vehicle trajectory is to avoid a collision with the obstacle
    - if the if the collision is predicted to occur in the second sub-zone of the second zone
      - S5.2.3: autonomously operating the vehicle with the collision avoidance system in a second sub-mode of the second collision avoidance mode,
        - S5.2.3.1: using the first braking system at maximum capacity and using the second braking system at partial capacity
        - S5.2.3.2: following a pre-planned trajectory received from a centralized platform

Fig. 8

S5.3: autonomously operating the vehicle with the collision avoidance system in a third collision avoidance mode S5.3.1: using only the first braking system for avoiding that the collision is predicted to occur closer to the vehicle than the third zone S5.3.2: re-planning a vehicle trajectory in a vehicle trajectory control system to avoid a collision with the obstacle.

METHOD FOR AUTONOMOUSLY CONTROLLING A VEHICLE

TECHNICAL FIELD

The present disclosure relates to methods for autonomously controlling a vehicle performed by a vehicle control system and vehicle control systems for autonomously controlling a vehicle.

BACKGROUND AND SUMMARY

Autonomously controlled vehicles, such as autonomously controlled dumper trucks, may use a predefined trajectory to move from a start position to an end position. The vehicle control system may identify its current position and control the vehicle along the predefined trajectory.

The vehicle control system may comprise a detection system for detecting obstacles, such as hitherto unknown stationary obstacles or moving objects such as vehicles or personnel. Such obstacles may not be taken into account when planning the trajectory for lack of information, or in the case of dynamic obstacles, because their position has changed, such that the vehicle control system needs methods for dealing with the detection of an obstacle in order to avoid a collision.

An object of the present disclosure is to provide a method for autonomously controlling a vehicle performed by a vehicle control system and a vehicle control system for autonomously controlling a vehicle having improved collision avoidance capabilities, such as improved capabilities to avoid collisions with obstacles.

This and other objects may be solved by embodiments of the present disclosure.

In an aspect of the present disclosure, obstacle avoidance concepts include real time calculation of zones based on present conditions of speed, grade, adhesion, and weight. In another aspect of the present disclosure, a combination of electric retarding and service brake augmentation is used to maintain prescribed distance margins. Some concepts minimize risk of collision, prioritize the use of the electric retarder, and minimize the use of service brakes where possible. In an aspect of the present disclosure, proactive obstacle avoidance where a vehicle control system re-plans around stationary and in-motion obstacles is used.

In a first embodiment, a method for autonomously controlling a vehicle performed by a vehicle control system is provided, the vehicle control system comprising a zone control system, a collision prediction system and a braking control system, the method comprising the steps of:
  defining in the zone control system at least a first zone and a second zone relative to a vehicle,
  predicting a collision with an obstacle with the prediction system,
  autonomously braking the vehicle with the braking control system in a first braking mode if the collision is predicted to occur in the first zone and braking the vehicle with the braking control system in a second braking mode if the collision is predicted to occur in the second zone.

In a second embodiment, a method for autonomously controlling a vehicle performed by a vehicle control system is provided, the vehicle control system comprising a zone control system, a collision prediction system and a collision avoidance system, the method comprising the steps of:
  defining in the zone control system zone at least a first and a third zone relative to a vehicle,
  predicting a collision with an obstacle with the prediction system,
  autonomously operating the vehicle with the collision avoidance system in a first collision avoidance mode if the collision is predicted to occur in the first zone and autonomously operating the vehicle with the collision avoidance system in a third collision avoidance mode if the collision is predicted to occur in the third zone.

In a third embodiment, a vehicle control system for autonomously controlling a vehicle is provided, the vehicle control system comprising a zone control system, a collision prediction system and a collision avoidance system, the vehicle control system being configured for performing a method comprising the steps of:
  defining in the zone control system zone at least a first and a third zone relative to a vehicle,
  predicting a collision with an obstacle with the prediction system,
  autonomously operating the vehicle with the collision avoidance system in a first collision avoidance mode if the collision is predicted to occur in the first zone and autonomously operating the vehicle with the collision avoidance system in a third collision avoidance mode if the collision is predicted to occur in the third zone.

BRIEF DESCRIPTION OF THE DRAWINGS

In the drawings,

FIG. 4 is a diagram exemplifying steps of a first embodiment of a method of the present disclosure, FIG. 5 is a diagram exemplifying steps of a second embodiment of a method of the present disclosure, FIG. 6 is a diagram exemplifying steps of a first collision avoidance mode of an embodiment of a method of the present disclosure, FIG. 7 is a diagram exemplifying steps of a second collision avoidance mode of an embodiment of a method of the present disclosure, and FIG. 8 is a diagram exemplifying steps of a third collision avoidance mode of an embodiment of a method of the present disclosure.

DETAILED DESCRIPTION

In the following, embodiments of methods for autonomously controlling a vehicle performed by a vehicle control system and of vehicle control systems for autonomously controlling a vehicle are described with respect to the drawings.

Figure 1:
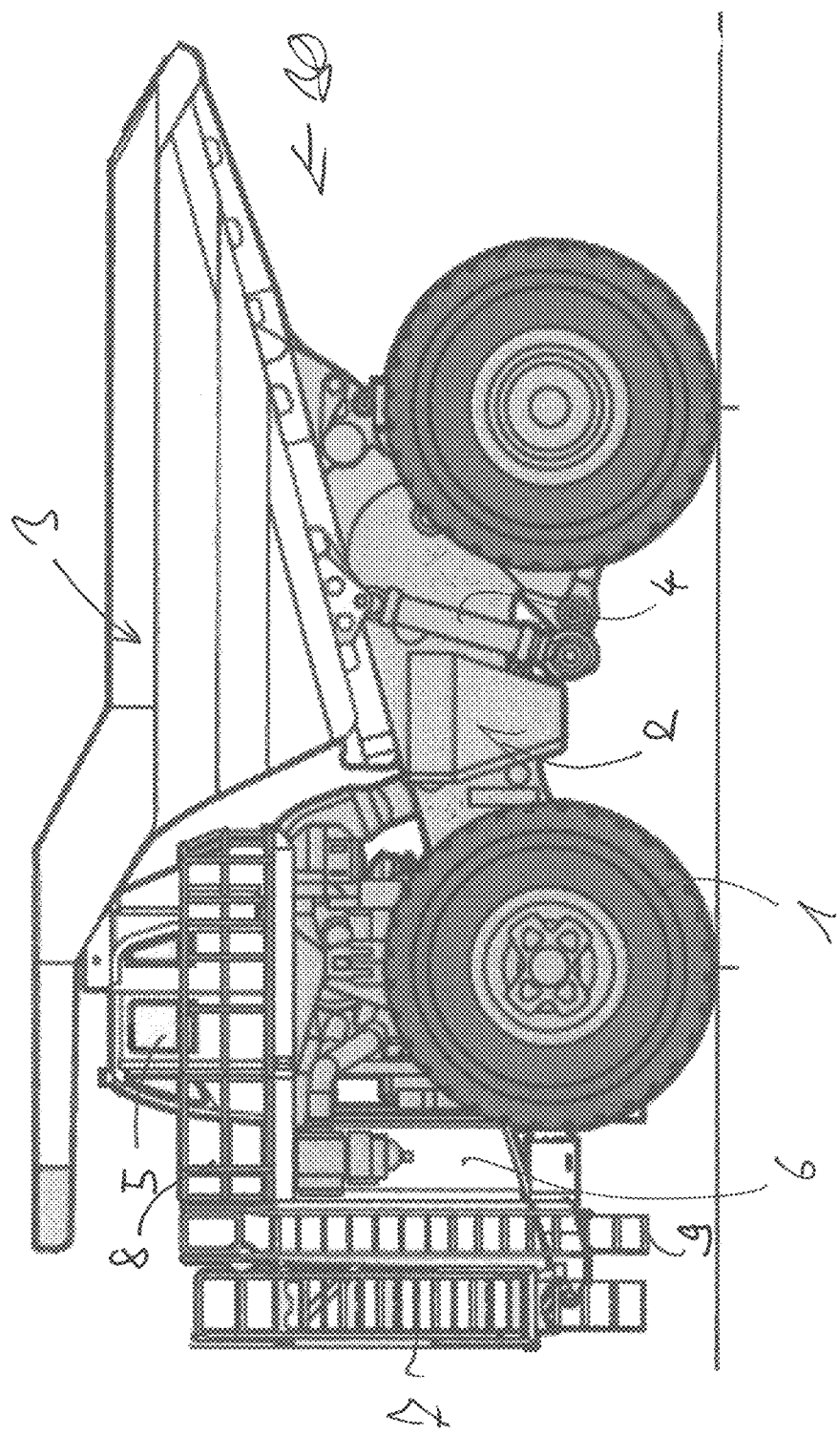
FIG. 1 is a side view of a dumper truck controlled autonomously in an embodiment by a method and control system of the present disclosure.

FIG. 1 shows an example of a vehicle autonomously controlled by such methods or control systems. In the embodiment, the vehicle is a dumper truck as used in mines for transport purposes. The dumper truck may have a payload of 100 metric tons or more.

The dumper truck 30 comprises a chassis 2 that is movable on wheels 1. The wheels 1 are driven by a drive unit 6 comprising at least one engine. The engine may be an internal combustion engine, e. g. a diesel engine. In an embodiment, the drive unit 6 may be a diesel-electric drive unit. The wheels may be driven by electric motors powered by a generator, the generator in turn driven by the diesel engine.

The dumper truck shown in FIG. 1 comprises a dump body 3 mounted on the chassis 2. The dump body is attached to the chassis with a horizontal pivot axis, and can be swiveled up by hoist cylinders 4 in order to let material contained in the dump body slide out of the dump body to the rear side of the dumper truck.

The dumper truck further comprises a cab 5 for a driver, in order to allow a manual operation of the dumper truck. In other embodiments, no cab may be provided. In the embodiment, the cab 5 is provided on a platform 8 arranged above the heat exchanger 9 and accessible via stairs 7.

Figure 2:
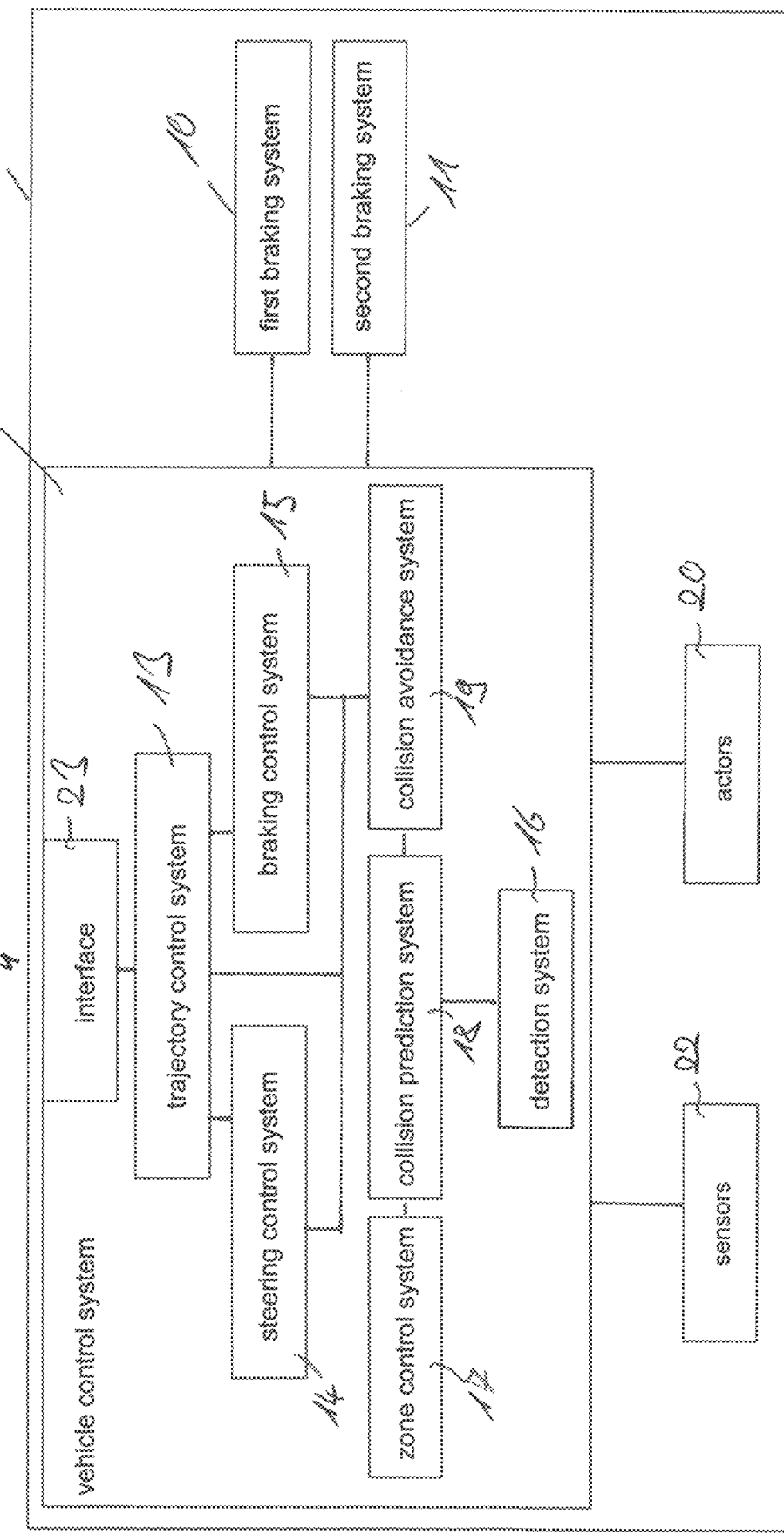
FIG. 2 is a schematic drawing showing functional parts of an embodiment of a control system of the present disclosure.

The dumper truck further comprises a vehicle control system for autonomously controlling the vehicle. Functional parts of an embodiment of such a vehicle control system, as well as other components of the dumper truck, are shown in FIG. 2.

The vehicle control system 12 comprises a zone control system 17, a collision prediction system 18 and a collision avoidance system 19. The collision avoidance system 19 may comprise a braking control system 15, or may be replaced by a braking control system.

The vehicle control system 12 may further comprise a detection system 16. The detection system 16 may be configured to evaluate the signals of sensors 22 arranged on the vehicle and to detect obstacles.

The vehicle control system may further comprise a trajectory control system 13 and a steering control system 14. The steering control system may control a steering system of the vehicle.

In an embodiment, the braking control system 15 may control a first braking system 10 and a second braking system 11 of the vehicle. The first braking system 10 may operate frictionless. The second braking system 11 may comprise friction brakes.

The first braking system 10 may be an electric retarder. The electric retarder may operate by controlling the electric drive motors of the vehicle to provide a braking torque to the wheels. The electric drive motors thereby generate electrical energy, which may be dissipated as heat by a resistor system, or may be recovered by an energy storage system. The second braking system 11 may comprise at least one service brake. The service brake may be a mechanical brake, such as a disk or wet brake.

The vehicle control system 12 may be connected to the sensors 22. At least one sensor 22 is connected to the detection system 16 and allows the detection system 16 to detect obstacles.

The vehicle control system 12 may be further connected to actuators 20. Such actuators may include steering actors connected to the steering control system 14, allowing the steering control system to steer the vehicle.

The vehicle control system 12 may communicate with a centralized platform 21, such as a fleet/traffic management system. For communicating with the centralized platform 21, the vehicle control system may comprise an interface 23. The interface 23 may be a wireless interface. The centralized platform 21 may be configured to communicate with a plurality of autonomously controlled vehicles. In particular, the centralized platform 21 may be configured to provide predetermined trajectories to a plurality of autonomously controlled vehicles.

Figure 3:
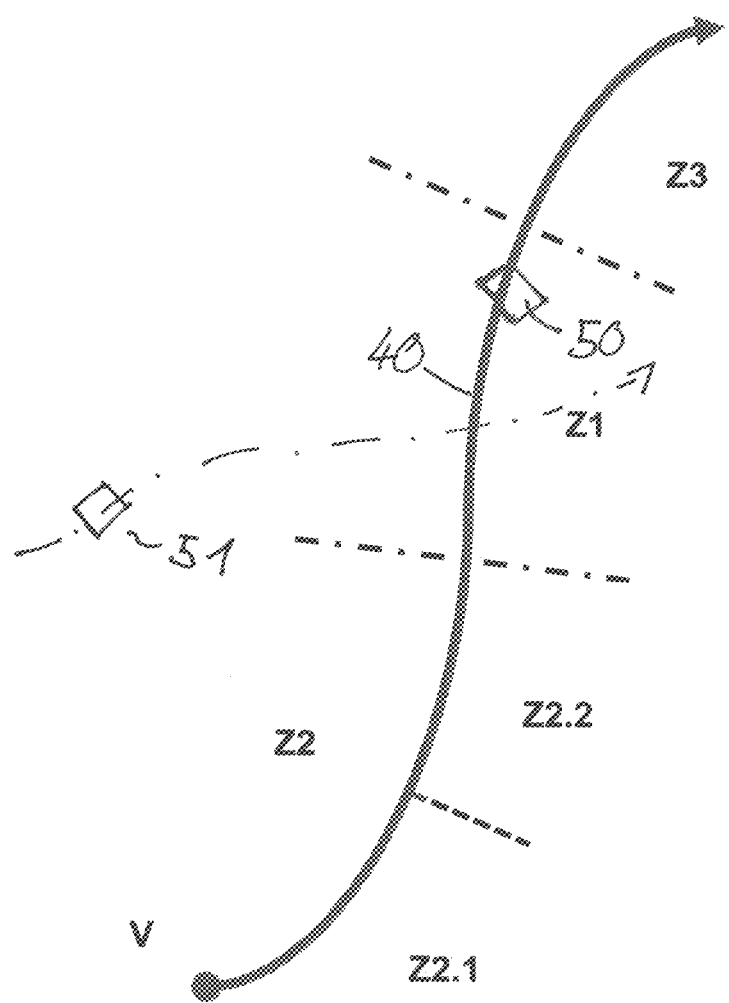
FIG. 3 is a first schematic drawing of zones used in an embodiment of a method and control system of the present disclosure.

The zone control system 17 may be configured to define zones relative to a vehicle V, as shown in FIG. 3. In the embodiment, the zones comprise a first zone Z1 and at least one out of a second zone Z2 and a third zone Z3. The second zone may comprise a first sub-zone Z2.1 and a second sub-zone Z2.2.

The first zone Z1 may be closer to the vehicle than the third zone Z3. The second zone Z2 may be closer to the vehicle than the first zone Z1. The first sub-zone Z2.1 may be closer to the vehicle than the second sub-zone Z2.2.

In an embodiment, the zones may extend in front of the vehicle V along a trajectory 40 of the vehicle. In particular, the zones may be arranged along a predefined trajectory 40 of the vehicle. The vehicle control system may use the predefined trajectory to control the vehicle to move from a start position to an end position along the predefined trajectory. The vehicle control system may identify its current position and control the vehicle along the predefined trajectory.

The detection system 16 may be configured to detect obstacles 50, such as hitherto unknown stationary obstacles 50 or dynamic obstacles 51 formed moving objects 51 such as vehicles or personnel. Such obstacles 50, 51 may not be taken into account when planning the trajectory for lack of information, or in the case of dynamic obstacles 51, because their position has changed since the trajectory was planned. The vehicle control system may be configured to perform methods for avoiding a collision with such obstacles 50 and 51.

In the following, embodiments of methods for autonomously controlling a vehicle are describe with respect to FIGS. 4 to 10. The methods may be autonomously performed by the vehicle control system onboard the vehicle. In particular, if not explicitly indicated to the contrary, all the method steps may be performed independently from the centralized platform, i.e. without intervention or control from the centralized platform.

The vehicle control system may comprise at least one microprocessor and software stored on non-transitory memory, the software running on the microprocessor to implement the functionality of the vehicle control system and the features of the methods for autonomously controlling a vehicle described herein. The various sub-systems of the vehicle control system may be implemented by software and/or hardware components of the vehicle control system.

In a first embodiment, schematically shown in FIG. 4, a method for autonomously controlling a vehicle performed by the vehicle control system 30 comprises the following steps:

In step S1, a real time calculation of at least one braking distance based on at least one vehicle condition is performed. The vehicle condition may comprise at least one parameter out of speed, grade, adhesion and vehicle weight. The vehicle weight may include the weight of a load transported by the vehicle. The at least one parameter may be determined based on sensors of the vehicle.

Step S2 comprises defining in the zone control system at least a first zone Z1 and a second zone Z2 relative to the vehicle V. At least one of the first and the second zone may depend on a braking distance calculated in step S1.

Step S3 comprises predicting a collision with an obstacle with the prediction system. In particular, step S3 may comprise detecting an obstacle and predicting whether there will be a collision of the vehicle with the obstacle. Step S3 may further comprise determining, if a collision is predicted, whether the collision is predicted to occur in the first zone or the second zone.

In an embodiment, the obstacle prediction system may be able to predict a collision both with static obstacles and with dynamic obstacles. In other embodiments, the obstacle prediction system may only be able to predict a collision with static obstacles or only with dynamic obstacles. If obstacle 50 is a static obstacle, a collision may be predicted by comparing the trajectory of the vehicle with a position of the obstacle. In case of a dynamic obstacle 51 the obstacle may not yet be positioned on the trajectory, but the system may anticipate a potential collision based on a speed and heading of obstacle 51. Therefore, for this embodiment, dynamic obstacle 51 does not have to be on the trajectory at this instance for the system to intervene.

If the collision is predicted to occur in the first zone Z1, the method proceeds to step S4. In step S4, autonomous braking of the vehicle is performed with the braking control system in a first braking mode. Embodiments of the first braking mode will be described in the following.

If the collision is predicted to occur in the second zone Z2, the method proceeds to step S5. In step S5, autonomous braking of the vehicle is performed with the braking control system in a second braking mode. Embodiments of the second braking mode will be described in the following.

The first braking mode used in step S4 may comprise the step of using only the first braking system and the second braking mode used in step S5 may comprise the step of using the first and the second braking system for braking the vehicle.

As indicated above, the first braking system may be an electric retarder and the second braking system may comprise at least one service brake.

In an embodiment, at least one out of the first braking mode and the second braking mode comprises braking the vehicle sufficiently to maintain or restore a prescribed distance margin.

In an embodiment, the method may comprise the further step of switching from the first braking mode to the second braking mode if the first braking mode is insufficient to restore the prescribed distance margin.

Step S3 of predicting a collision with an obstacle with the prediction system may comprise one or more of the following sub-steps:

In an embodiment, step S3 may comprise the sub-step of detecting the obstacle with a detection system of the vehicle control system.

In an embodiment, step S3 may comprise the sub-step of determining whether an obstacle is a stationary obstacle or a dynamic obstacle.

In an embodiment, step S3 may comprise the sub-step of comparing a trajectory of the vehicle with a position of the obstacle to predict the collision. In particular, this step may be applied if the obstacle is determined to be a stationary obstacle.

In an embodiment, step S3 may comprise the sub-step of detecting a movement, in particular a speed and heading of the obstacle with a detection system of the vehicle control system for predicting a trajectory of the obstacle. In particular, this step may be applied if the obstacle is determined to be a dynamic obstacle.

In an embodiment, step S3 may comprise the sub-step of receiving via an interface of the vehicle control system information on the trajectory of the obstacle. In particular, this step may be applied if the obstacle is determined to be a dynamic obstacle controlled to follow a trajectory. The vehicle control system may in particular receive the information on the trajectory of the obstacle from the centralized platform.

In an embodiment, step S3 may comprise the sub-step of comparing a trajectory of the vehicle with a trajectory of the obstacle to predict the collision. In particular, this step may be applied if the obstacle is determined to be a dynamic obstacle.

In an embodiment, in case that the obstacle is a dynamic obstacle controlled to follow a predetermined trajectory, step S3 may comprise the following sub-steps:
- detecting a movement of the obstacle with a detection system of the vehicle control system,
- receiving via an interface of the vehicle control system information on the predetermined trajectory of the obstacle,
- predicting a trajectory of the obstacle from the movement of the obstacle detected by the detection system and the predetermined trajectory of the obstacle received via the interface, and
- comparing a trajectory of the vehicle with the predicted trajectory of the obstacle to predict the collision Embodiments of a method using additional zones or sub-zones will be described in the following:

In an embodiment where the second zone Z2 comprises a first sub-zone Z2.1 and a second sub-zone Z2.2, the second braking mode may comprise a first sub-mode active when the collision is predicted to occur in the first sub-zone Z2.1 and a second sub-mode active when the collision is predicted to occur in the second sub-zone Z2.2.

In the first sub-mode, the first and the second braking system may be used at maximum braking capacity, and in the second sub-mode, the first braking system may be used at maximum capacity and the second braking system may be used at partial capacity. The partial capacity may be controlled in order to maintain or restore a prescribed distance margin.

In an embodiment, in the first braking mode used in step S4, the vehicle follows a pre-planned trajectory received from the centralized platform. In the second braking mode used in Step S5, or in a first sub-mode of the second braking mode, a vehicle trajectory control system of the vehicle control system may re-plan a vehicle trajectory independently from the centralized platform to avoid a collision with the obstacle. In a second sub-mode of the second braking mode, the vehicle may follow a pre-planned trajectory received from the centralized platform.

In an embodiment, the method may comprise the further steps of:
- defining in the zone control system a third zone Z3,
- determining whether the collision is predicted to occur in the first zone Z1, the second zone Z2 or third zone Z3.

If the collision is predicted to occur in the first zone Z1 or the second zone Z2, the method may follow the steps S4 and S5, respectively.

If the collision is predicted to occur in the third zone Z3, the method may comprise the step of re-planning a vehicle trajectory independently from the centralized platform in a vehicle trajectory control system of the vehicle control system to avoid a collision with the obstacle if the collision is predicted to occur in the third zone.

If the collision is predicted to occur in the third zone Z3, the method may comprise the step of autonomously braking the vehicle with the braking control system in a third braking mode. The third braking mode may comprise the step of using only the first braking system for braking the vehicle.

In the third braking mode, the first braking system may be used at partial capacity controlled in order to maintain a prescribed distance margin.

A further embodiment of a method for autonomously controlling a vehicle performed by a vehicle control system, schematically shown in FIG. 5, may comprise the following steps:

In step S1, a real time calculation of at least one braking distance based on at least one vehicle condition is performed. The vehicle condition may comprise at least one parameter out of speed, grade, adhesion and vehicle weight. The vehicle weight may include the weight of a load transported by the vehicle. The at least one parameter may be determined based on sensors of the vehicle.

Step S2 comprises defining in the zone control system at least a first zone Z1, a second zone Z2 and a third zone Z3 relative to a vehicle position V. At least one of the first and the second zone may depend on a braking distance calculated in step S1.

Step S3 comprises predicting a collision with an obstacle with the collision prediction system. Step S3 may further comprise determining whether the collision is predicted to occur in in one out of the first zone, the second zone and the third zone Z3. In particular, step S3 may comprise detecting an obstacle, predicting whether there will be a collision, and determining whether the predicted collision will take place in the first zone, the second zone or the third zone.

In step S4, the vehicle control system may determine whether the vehicle is in a dynamic or a static state. In a dynamic state, the vehicle may be moving along a trajectory. In a static state, the vehicle stays at a fixed position.

If a dynamic state of the vehicle is detected in step S4, the method proceeds as follows:

If the collision is predicted to occur in the first zone Z1, the method proceeds to step S5.1. In step S5.1, the vehicle is autonomously operated with the collision avoidance system in a first collision avoidance mode.

If the collision is predicted to occur in the second zone Z2, the method proceeds to step S5.2. In step S5.2, the vehicle is autonomously operated with the collision avoidance system in a second collision avoidance mode.

If the collision is predicted to occur in the third zone Z3, the method proceeds to step S5.3. In step S5.3, the vehicle is autonomously operated with the collision avoidance system in a third collision avoidance mode.

Embodiments of the first, second and third collision avoidance mode will be described with respect to FIGS. 6 to 8.

If a static state of the vehicle is detected in step S4, the method proceeds as follows:

If the collision is predicted to occur in the first zone Z1 or the third zone Z3, a trajectory of the vehicle is re-planned independently from the centralized platform before starting motion of the vehicle in step S6.2.

If the collision is predicted to occur in the second zone Z2, motion of the vehicle is inhibited in step S6.1.

Step S4 of determining whether the vehicle is in a static or a dynamic state may be optional. The method may only comprise the steps described for the dynamic state or only the steps described for the static state.

Alternative embodiments may comprise defining at least two zones out of the first, the second and the third zone. Alternative embodiments may comprise operating the vehicle in at least two out of the first, the second and the third collision avoidance mode.

FIG. 6 shows sub-steps S5.1.1, S5.1.2 and S5.1.3 of the step S5.1 of autonomously operating the vehicle with the collision avoidance system in a first collision avoidance mode.

Step S5.1.1 comprises following a pre-planned trajectory received from a centralized platform. Step S5.1.2 comprises autonomously braking the vehicle in a first braking mode with a braking control system of the vehicle. The first braking mode may comprise the step of using only the first braking system for braking the vehicle.

Step S5.1.3 comprises switching from the first collision avoidance mode to the third collision avoidance mode when the step S5.1.2 of braking of the vehicle in the first collision avoidance mode results in that the collision is predicted to occur in the third zone.

FIG. 7 shows sub-steps of the step S5.2 of autonomously operating the vehicle with the collision avoidance system in a second collision avoidance mode.

Step S5.2.1 comprises defining a first sub-zone and a second sub-zone of the second zone. Step S5.2.1 may further comprise determining whether the collision is predicted to occur in a first sub-zone Z2.1 or a second sub-zone Z2.2. of the second zone Z2.

If the collision is predicted to occur in the first sub-zone Z2.1 of the second zone Z2, the method proceeds to step S5.2.2. In step S5.2.2, the vehicle is autonomously operated with the collision avoidance system in a first sub-mode of a second collision avoidance mode. The first sub-mode of a second collision avoidance mode may comprise step S5.2.2.1 of using the first and the second braking system at maximum braking capacity and step S5.2.2.2 of emergency re-planning in a vehicle trajectory control system a vehicle trajectory is to avoid a collision with the obstacle. The emergency re-planning may be performed independently from the centralized platform.

If the collision is predicted to occur in the second sub-zone Z2.2 of the second zone Z2, the method proceeds to step S5.2.3. In step S5.2.3, the vehicle is autonomously operated with the collision avoidance system in a second sub-mode of a second collision avoidance mode. The second sub-mode of a second collision avoidance mode may comprise step S5.2.3.1 of using the first braking system at maximum capacity and using the second braking system at partial capacity and step S5.1.3.2 of following a pre-planned trajectory received from the centralized platform. The partial capacity may be controlled so as to maintain a distance margin.

FIG. 8 shows sub-steps S5.3.1 and S5.3.2 of the step S5.3 of autonomously operating the vehicle with the collision avoidance system in a third collision avoidance mode.

Step S5.3.1 comprises using only the first braking system for keeping the obstacle within the third zone and step S5.3.2 comprises re-planning a vehicle trajectory independently from a centralized platform in a vehicle trajectory control system of the vehicle control system to avoid a collision with the obstacle. The vehicle trajectory control system therefore may perform this intervention to the predetermined trajectory received from the centralized platform on board the vehicle without the aid of the centralized platform. In particular, the centralized platform works on the assumption that the vehicle will follow the original trajectory received from the centralized platform, but the vehicle instead takes this intervention, makes its own decision, and informs the centralized platform that it is in the process of this behavior.

Any of the methods described above may further comprise at least one out of the further steps of:

receiving a pre-defined trajectory from the centralized platform in a trajectory control system and pre-defining a trajectory in a trajectory control system.

In an embodiment, the methods may comprise the further step of controlling the vehicle along the predefined trajectory by a steering control system.

In an embodiment, the methods for autonomously controlling a vehicle described above may be performed while the vehicle is controlled by a steering control system along a predefined trajectory.

The methods of the present disclosure described with respect to FIGS. 5 to 8 may comprise any of the features and steps described with respect to FIG. 4.

The vehicle control system may perform reactive and proactive obstacle avoidance as described in the following and within the ability of the vehicle, the vehicle control system may act to stop at a distance greater than the distance margin to a static obstacle or maintain or restore a distance margin to a dynamic obstacle.

Figure 9:
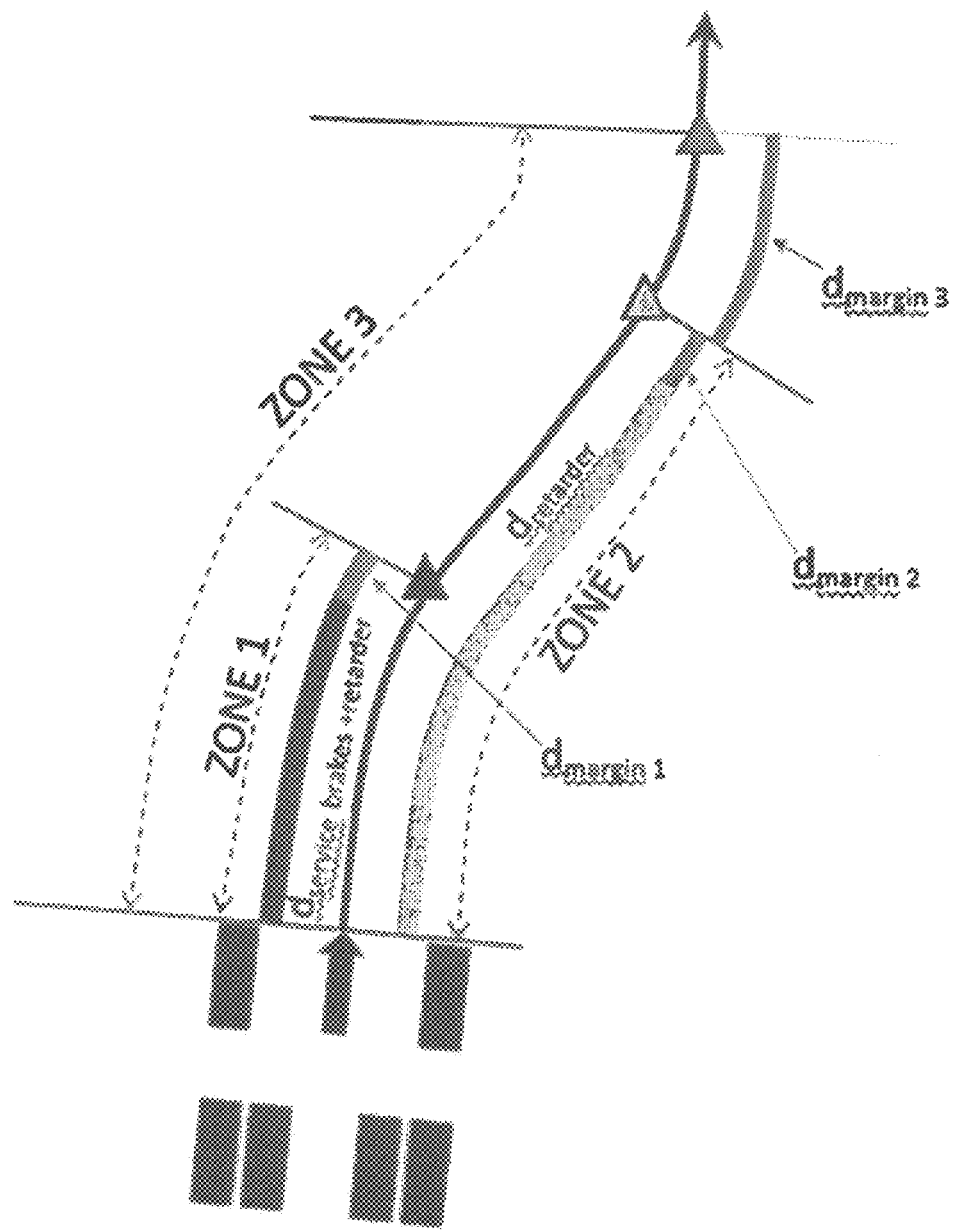
FIG. 9 is a second schematic drawing of zones used in an embodiment of a method and control system of the present disclosure.
Figure 10:
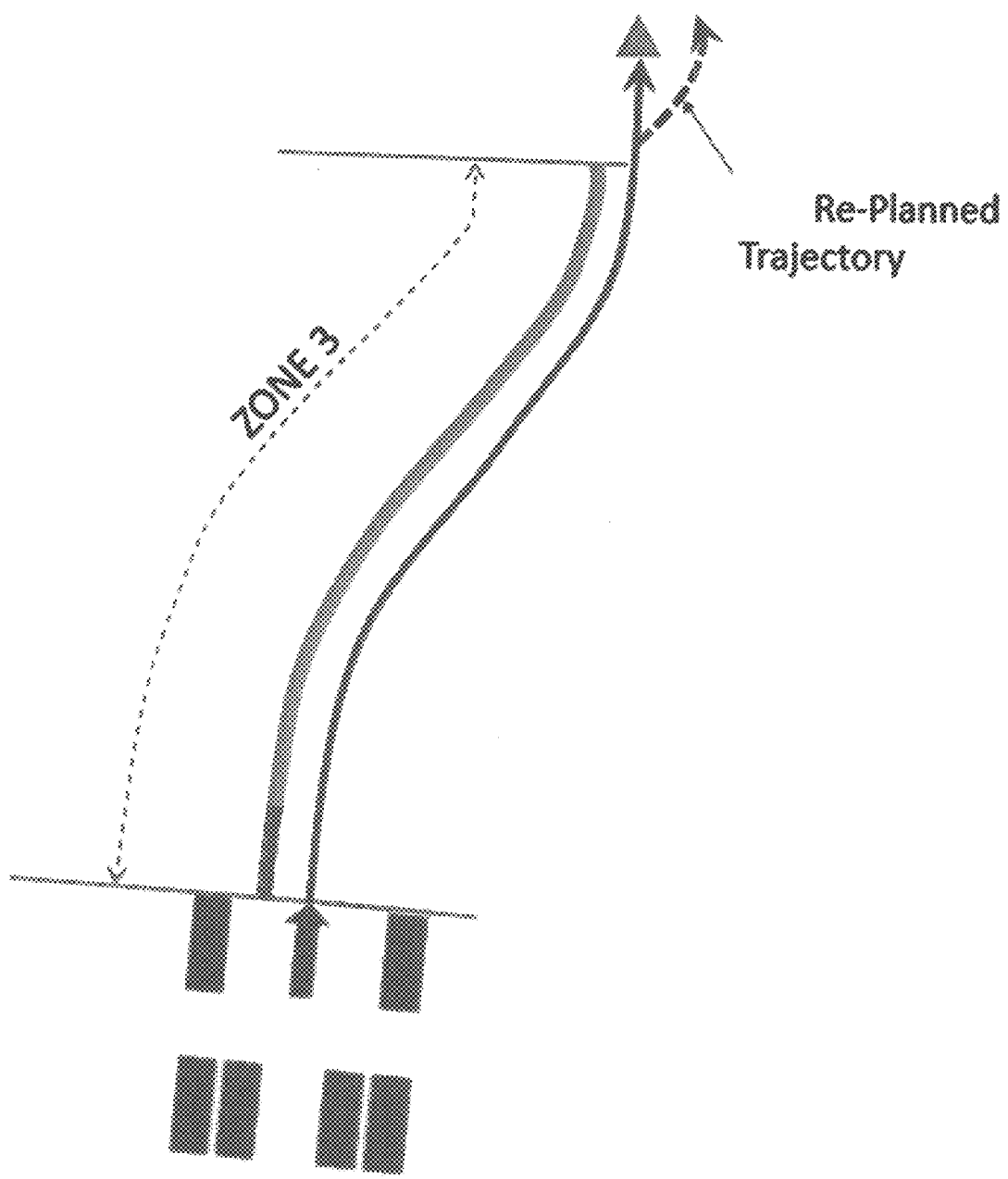
FIG. 10 is third schematic drawing of zones used in an embodiment of a method and control system of the present disclosure.

Further embodiments are now described with respect to FIGS. 9 and 10. For the purposes of obstacle avoidance, the vehicle control system may calculate three distance zones that will represent the margin available to avoid striking an object and serve as the basis for avoidance related decisions. These zones may be updated continuously. FIGS. 9 and 10 depict the zone concept.

Zone 1

Zone 1 may be defined as the stopping distance required under present conditions of speed, grade, adhesion, and GVW (Gross Vehicle Weight) to stop, utilizing the first braking system, in particular the dynamic retarder, at 100% and the second braking system, in particular the service brakes, at 100% brake capability+$d_{margin\ 1}$.

Zone 2

Zone 2 may be defined as the stopping distance required under present conditions of speed, grade, adhesion, and GVW to stop, utilizing only the first braking system at 100%+$d_{margin\ 2}$.

Zone 3

Zone 3 may be defined as Zone 2+$d_{margin\ 3}$. Conceptually this represents the maximum distance along the trajectory of the vehicle where reactive obstacle avoidance may be used. For obstacles first detected at a distance greater than Zone 3, pro-active obstacle avoidance may be used.

Margins

The distance margins for each zone may be configurable.

In an embodiment, the zones described with respect to FIGS. 9 and 10 may correspond as follows to the zones described above with respect to FIGS. 3 to 8:

| FIG. 9 and 10 | FIG. 3 to 8 |
|---|---|
| Beyond Zone 3 | Third zone Z3 |
| Between Zone 3 and Zone 2 | First zone Z1 |
| Zone 2 | Second zone Z2 |
| Between Zone 2 and Zone 1 | Second sub-zone Z2.2 of zone Z2 |
| Zone 1 | First sub-zone Z2.1 of zone Z2 |

Other correspondences may equally apply.

Reactive Obstacle Avoidance

For the purposes of this specification, reactive obstacle avoidance may be defined as a vehicle in motion performing real-time maneuvers to maintain distance margins to avoid striking an object. Reactive obstacle avoidance involves predicting an obstacle and acting under the sole guidance of the vehicle control system to maintain distance margins. The vehicle control system must independently manage the situation and avoid the obstacles prior to supervisory intervention. Reactive obstacle avoidance is described with reference to FIG. 9. It may correspond to concepts of the first and second obstacle avoidance mode described above.

Embodiments of reactive obstacle avoidance include but are not limited to:

The vehicle control system may compare the vehicle trajectory (which may include the width of the vehicle) with stationary obstacles and the trajectory of dynamic obstacles that have been detected and take action to stop within the appropriate distance margin.

When the in-motion obstacles are other autonomous assets with defined trajectories, the vehicle control system may use the other autonomous assets defined trajectories to augment the predictions of collisions and avoid false execution of obstacle avoidance.

When an obstacle (including a predicted collision) is detected between Zone 3 and 2, the vehicle control system may reduce the commanded speed at a rate that results in the braking control system applying only the first braking system to slow the machine to match the velocity of the obstacle, or stop if the object is stationary. The existing planned trajectory may not be altered and no steering deviations may be utilized. When possible, the speed may be reduced such that the vehicle achieves a distance from the obstacle greater than Zone 3 distance. Once this is achieved, the logic may shift to proactive obstacle avoidance-dynamic as described later on. The intention is to slow the machine to maintain safe distances and be able to turn the situation into a proactive avoidance allowing the truck to avoid the obstacle without coming to a complete stop. In the event the obstacle becomes closer than Zone 2, the logic for an obstacle in Zone 2 or Zone 1 may be utilized as specified later on. The vehicle control system may send an Obstacle Avoidance Status to traffic management.

When an obstacle or predicted collision is detected between Zone 2 and 1, the vehicle control system may reduce the commanded speed at a rate that results in the braking control system applying the first braking system at 100% and the second braking system partially in an attempt to restore a distance from the obstacle greater than or equal to the Zone 2 distance. Once the distance from the vehicle to the obstacle has increased to a distance greater than Zone 2, the logic for an obstacle detected between Zone 3 and Zone 2 may be utilized. If the distance from the vehicle to the obstacle reduces to be equal to Zone 1, then the logic for Zone 1 may be utilized. The vehicle control system may send and Obstacle Avoidance Status to traffic management.

When an obstacle or predicted collision is detected closer than Zone 1, the vehicle may reduce the commanded speed to zero to result in the braking control system applying the first braking system at 100% and the second braking system at 100% actuation (e.g. vehicle control system velocity reference step function to zero) to maximize deceleration of the vehicle. In parallel with the speed reduction, the vehicle control system may plan a new emergency trajectory. The emergency trajectory may consider the traversable area, location of obstacles (including trajectory of in motion obstacles), vehicle stability limits, and calculate an emergency trajectory of sufficient length to decelerate the vehicle to a stop. In the event that it is impossible to calculate an emergency trajectory that satisfies all constraints, the vehicle control system may have configurable options to determine priority of constraints to adhere to. The vehicle control system may send an Obstacle Avoidance Status to traffic management.

The vehicle control system may have the capability to identify the relative velocities of the vehicle and approaching obstacles and use the relative velocity information to achieve distance margins. For example in-motion obstacles approaching the vehicle will require more aggressive action to maintain zone distances than obstacles moving in the same direction as the vehicle.

After an emergency trajectory fault, the vehicle control system may report a fault and a reset from traffic management may be required to trigger the return to normal autonomous operations.

The vehicle control system may log the coordinates of all planned paths of the emergency trajectory and which path was implemented.

Proactive Obstacle Avoidance-Dynamic

For the purposes of this specification, Proactive Obstacle Avoidance—Dynamic may be defined as the act of the vehicle control system predicting an obstacle with static or in-motion obstacles and re-planning the trajectory to proactively avoid a collision of an OHT in motion. It differs from the concept of an emergency trajectory in that the collision is predicted beyond Zone 3, and up to the limits of the sensors 22, with sufficient distance and time to reduce vehicle speed and re-plan around the obstacle without the use of the second braking system.

Authority limits for the vehicle control system may be defined that restrict the level of re-planning the vehicle control system is allowed to perform without human intervention.

Proactive Obstacle Avoidance is to be executed for objects detected beyond Zone 3. Proactive vehicle avoidance is described with reference to FIG. 10. It may correspond to concepts of the third obstacle avoidance mode described above.

Embodiments of proactive obstacle avoidance include but are not limited to:

When objects are detected at a distance greater than Zone 3 and up to the limits of the sensors 22, the vehicle may reduce the commanded speed at a rate to only use the first braking system to maintain a distance greater than the Zone 3 distance (except during re-plan maneuvers). In parallel, the vehicle control system may begin the process of re-planning around the obstacle. The vehicle control system may send an Obstacle Avoidance Status to the traffic management.

The re-planning may respect the minimum distances described above.

When traversing a two-way road, the vehicle control system may re-plan the present trajectory to avoid the obstacle provided the new trajectory is within boundary of the traversable area and there are no additional obstacles or traffic within the opposite lane. The re-planning may respect the minimum distances described above.

The vehicle control system may control the vehicle along the re-planned trajectory with a speed equivalent to the lesser of the speed to maintain a distance equal to Zone 3 or approach speed.

The vehicle control system may report an event message to denote the execution of a re-planned trajectory to traffic management.

The vehicle control system may log the coordinates of the re-planned trajectory.

If the vehicle control system cannot determine a valid re-planning of the trajectory within the constraints described above, then the vehicle may reduce the commanded speed at a rate that results in the braking control system applying only the first braking system to slow the machine (within the retarding envelope), maintaining a distance greater than Zone 2 and stopping the machine.

Proactive Obstacle Avoidance—Static

For the purposes of this specification, Proactive Obstacle Avoidance—Static, may be defined as the act of the vehicle control system inhibiting the motion of a stationary vehicle to avoid a collision.

Embodiments for proactive obstacle avoidance-static include but are not limited to:

The vehicle control system may inhibit autonomous motion if an obstacle is detected within Zone 1. The vehicle control system may send an Obstacle Avoidance Status to traffic management. The vehicle control system may request intervention from traffic management.

If the obstacle is between Zone 2 and Zone 1 or in Zone 3, the vehicle control system may re-plan a trajectory around the obstacle. The vehicle control system may command the vehicle to execute the re-planned trajectory and resume autonomous operation.

The invention claimed is:

1. A method for autonomously controlling a vehicle performed by a vehicle control system, the vehicle control system comprising a zone control system, a collision prediction system and a braking control system, the method comprising steps of:
defining in the zone control system at least a first zone and a second zone relative to the vehicle,
predicting a collision with an obstacle with the prediction system,
autonomously braking the vehicle with the braking control system in a first braking mode if the collision is predicted to occur in the first zone and braking the vehicle with the braking control system in a second braking mode if the collision is predicted to occur in the second zone,
wherein the vehicle comprises a first braking system and a second braking system, and wherein the first braking mode comprises a step of using only the first braking system and the second braking mode comprises a step of using the first and the second braking system for braking the vehicle,
wherein the second zone comprises a first sub-zone and a second sub-zone, and wherein second braking mode comprises a first sub-mode active when the collision is predicted to occur in the first sub-zone and a second sub-mode active when the collision is predicted to occur in the second sub-zone, wherein in the first sub-mode, the first and the second braking systems are used at maximum braking capacity, and wherein in the second sub-mode, the first braking system is used at maximum capacity and the second braking system is used at partial capacity.

2. The method of claim 1, wherein the first braking system is an electric retarder and the second braking system comprises at least one service brake.

3. The method of claim 1, wherein at least one out of the first braking mode and the second braking mode comprises braking the vehicle sufficiently to maintain or restore a prescribed distance margin.

4. The method of claim 3, comprising a further step of:
switching from the first braking mode to the second braking mode if the first braking mode is insufficient to restore the prescribed distance margin.

5. The method of claim 1, comprising at least one out of the following further steps:
detecting the obstacle with a detection system of the vehicle control system, and if the obstacle is stationary, comparing a trajectory of the vehicle with a position of the obstacle to predict the collision.

6. The method of claim 1, comprising at least one out of the following further steps:
   if the obstacle is a dynamic obstacle, detecting a movement of the obstacle with a detection system of the vehicle control system for predicting a trajectory of the obstacle,
   if the obstacle is a dynamic obstacle controlled to follow a trajectory, receiving via an interface of the vehicle control system information on the trajectory of the obstacle, and
   if the obstacle is a dynamic obstacle, comparing a trajectory of the vehicle with a trajectory of the obstacle to predict the collision.

7. The method of claim 1, wherein the obstacle is a dynamic obstacle controlled to follow a predetermined trajectory, the method comprising the following further steps:
   detecting a movement of the obstacle with a detection system of the vehicle control system,
   receiving via an interface of the vehicle control system information on the predetermined trajectory of the obstacle,
   predicting a trajectory of the obstacle from the movement of the obstacle detected by the detection system and the predetermined trajectory of the obstacle received via the interface, and
   comparing a trajectory of the vehicle with the predicted trajectory of the obstacle to predict the collision.

8. The method of claim 1, wherein the step of defining the first zone and the second zone comprises a real time calculation of at least one braking distance based on at least one vehicle condition, wherein the vehicle condition comprises at least one parameter out of speed, grade, adhesion and vehicle weight.

9. The method of claim 1, wherein in the first braking mode, the vehicle follows a pre-planned trajectory received from a centralized platform and in the second braking mode or a first sub-mode of the second braking mode, a vehicle trajectory control system of the vehicle control system re-plans a vehicle trajectory independently from the centralized platform to avoid the collision.

10. The method of claim 1, comprising further steps of:
    defining in the zone control system a third zone,
    re-planning a vehicle trajectory independently from a centralized platform in a vehicle trajectory control system of the vehicle control system to avoid the collision if the collision is predicted to occur in the third zone.

11. A method for autonomously controlling a vehicle performed by a vehicle control system, the vehicle control system comprising a zone control system, a collision prediction system and a collision avoidance system, the method comprising the steps of:
    receiving a pre-planned trajectory for the vehicle from a centralized platform,
    defining in the zone control system zone at least a first and a third zone relative to a vehicle, wherein the first zone is located closer to the vehicle than the third zone,
    predicting a collision with an obstacle with the collision prediction system,
    autonomously operating the vehicle with the collision avoidance system in one of the following modes:
    in a first collision avoidance mode if the collision is predicted to occur in the first zone, wherein the first collision avoidance mode comprises a step of following the pre-planned trajectory received from the centralized platform and autonomously braking the vehicle with a braking control system of the vehicle, and
    in a third collision avoidance mode if the collision is predicted to occur in the third zone, wherein the third collision avoidance mode comprises a step of re-planning a vehicle trajectory independently from the centralized platform in a vehicle trajectory control system of the vehicle control system to avoid the collision.

12. The method of claim 11, comprising a further step of switching from the first collision avoidance mode to the third collision avoidance mode when the step of braking of the vehicle of the first collision avoidance mode results in that the collision is predicted to occur in the third zone.

13. The method of claim 11, comprising further steps of:
    defining in the zone control system a second zone, wherein the second zone is located closer to the vehicle than the first and the third zone,
    autonomously operating the vehicle with the collision avoidance system in a second collision avoidance mode or a first sub-mode of a second collision avoidance mode if the collision is predicted to occur in the second zone or a first sub-zone of the second zone, wherein in the second collision avoidance mode or the first sub-mode of the second collision avoidance mode a vehicle trajectory is emergency re-planned independently from the centralized platform in the vehicle trajectory control system of the vehicle control system to avoid the collision.

14. The method of claim 13, wherein the vehicle control system further comprises a braking control system, the method further comprising steps of:
    autonomously braking the vehicle with the braking control system in a first braking mode if the collision is predicted to occur in the first zone and
    autonomously braking the vehicle with the braking control system in a second braking mode if the collision is predicted to occur in the second zone.

15. The method of claim 14, wherein the vehicle comprises a first braking system and a second braking system, and wherein the first braking mode comprises a step of using only the first braking system and the second braking mode comprises a step of using the first and the second braking system for braking the vehicle.

16. The method of claim 11, wherein the vehicle comprises a first braking system and a second braking system, and wherein the third collision avoidance mode comprises a step of using only the first braking system for avoiding that the collision is predicted to occur closer to the vehicle than the third zone.

17. The method of claim 11, wherein the vehicle control system comprises a proactive collision avoidance system active when the vehicle is in a static state, wherein the method comprises steps of:
    inhibiting motion of the vehicle when the collision is predicted to occur in the second zone or a first sub-zone of the second zone, and
    re-planning a trajectory of the vehicle independently from a centralized platform in a vehicle trajectory control system of the vehicle control system when the collision is predicted to occur in the first or third zone.

18. The method of claim 1, wherein the vehicle is a dumper truck for mining operations.

19. The method of claim 11, wherein the vehicle is a dumper truck for mining operations.

20. A vehicle control system for autonomously controlling a vehicle, the vehicle control system comprising a zone control system, a collision prediction system and a collision avoidance system, the vehicle control system being configured for performing a method comprising steps of:

defining in the zone control system at least a first and a third zone each comprising a distance in front of a vehicle along a current trajectory of the vehicle, predicting a collision with an obstacle with the collision prediction system and determining which zone the collision will occur within, and autonomously operating the vehicle with the collision avoidance system in a first collision avoidance mode if the collision is predicted to occur in the first zone and autonomously operating the vehicle with the collision avoidance system in a third collision avoidance mode if the collision is predicted to occur in the third zone.

21. The vehicle control system of claim 20, comprising a communication interface configured to communicate with a centralized platform, wherein the trajectory of the vehicle is a pre-planned trajectory received form the centralized platform.

22. The vehicle control system of claim 20, wherein the vehicle comprises a first braking system and a second braking system, and the vehicle control system is configured such that:

the first braking mode comprises a step of using only the first braking system and the second braking mode comprises a step of using the first and the second braking system for braking the vehicle, the second zone comprises a first sub-zone and a second sub-zone, and the second braking mode comprises a first sub-mode active when the collision is predicted to occur in the first sub-zone and a second sub-mode active when the collision is predicted to occur in the second sub-zone, wherein in the first sub-mode, the first and the second braking systems are used at maximum braking capacity, and wherein in the second sub-mode, the first braking system is used at maximum capacity and the second braking system is used at partial capacity.

* * * * *